…

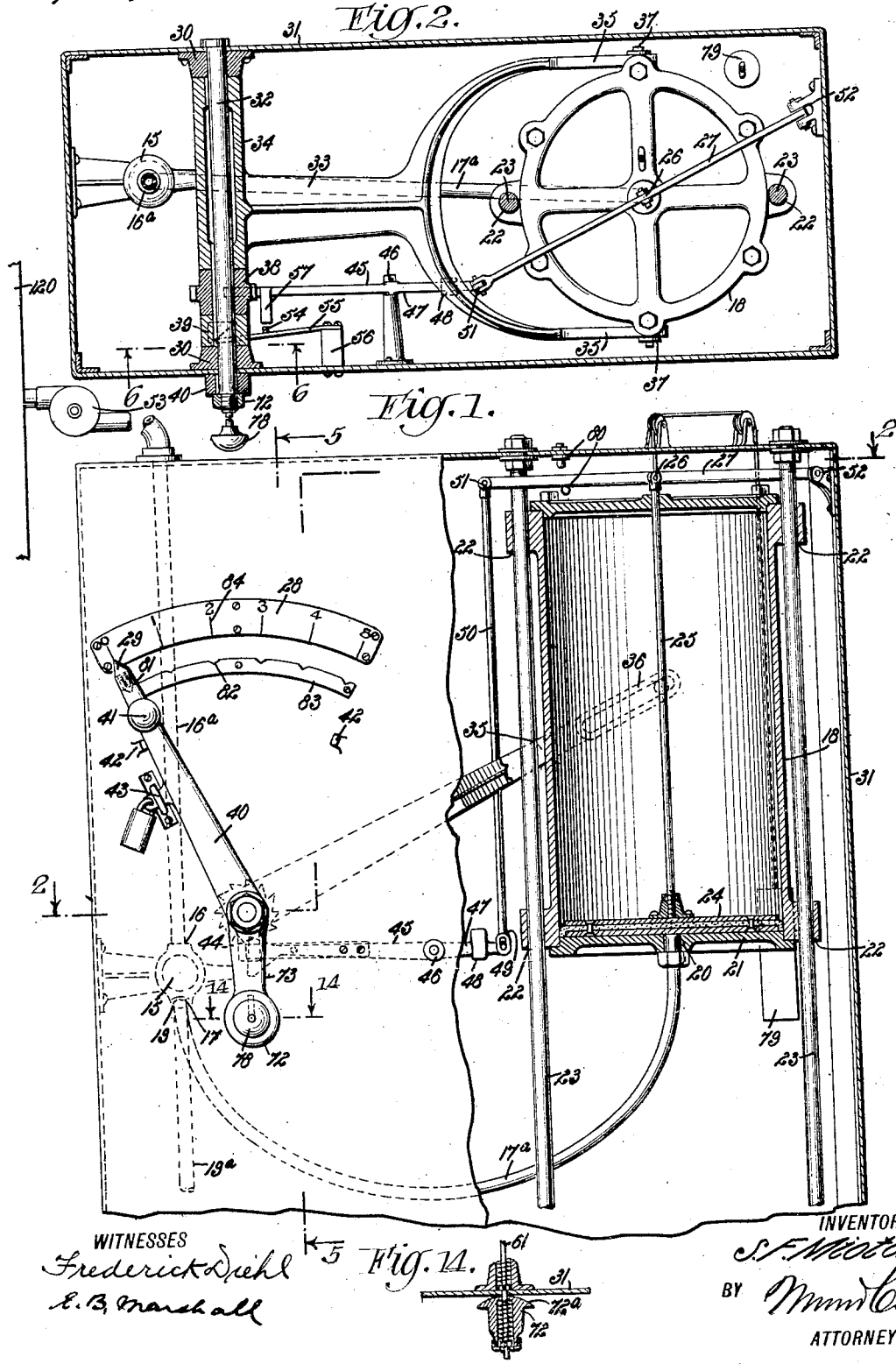

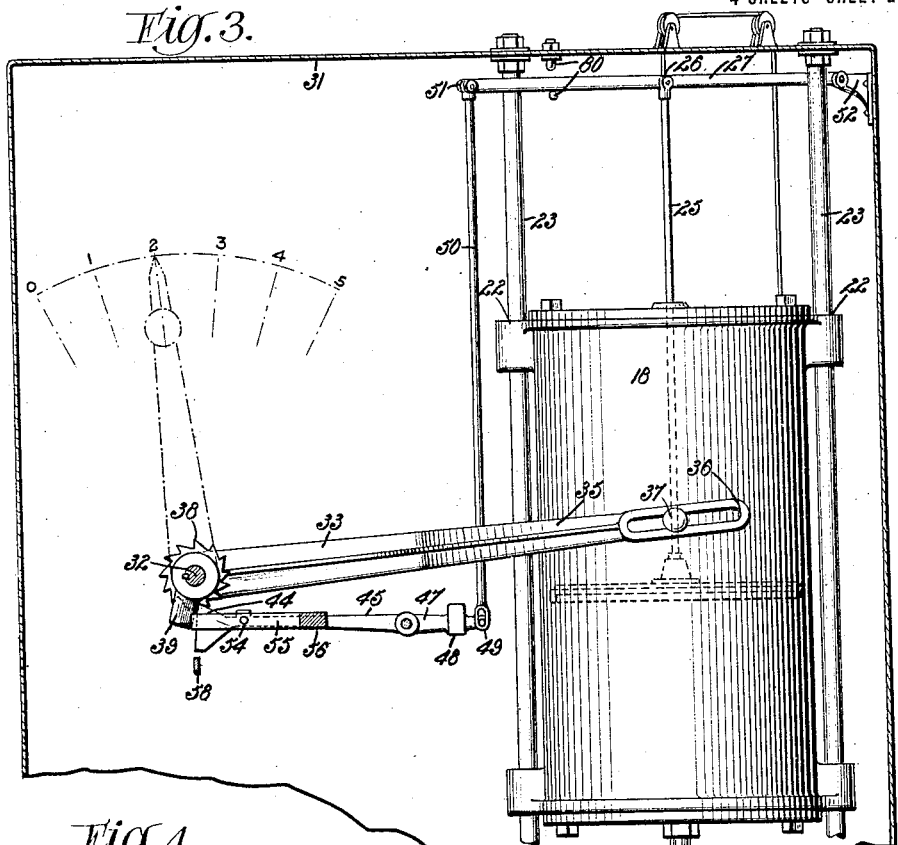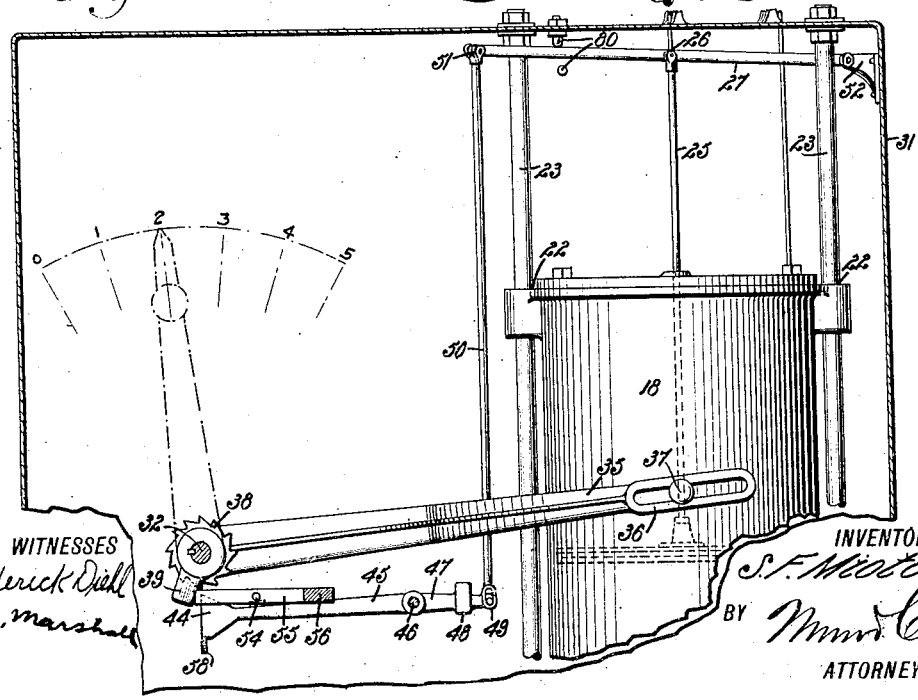

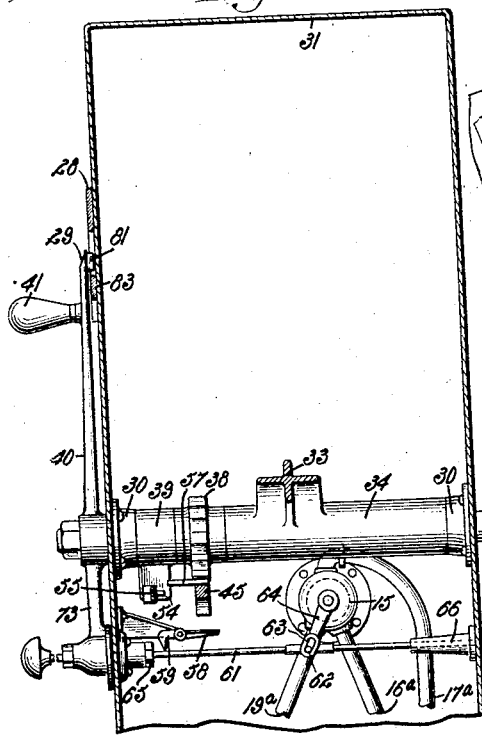
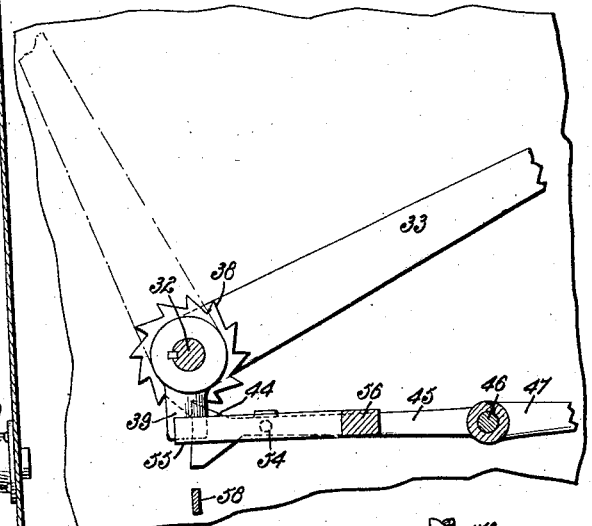
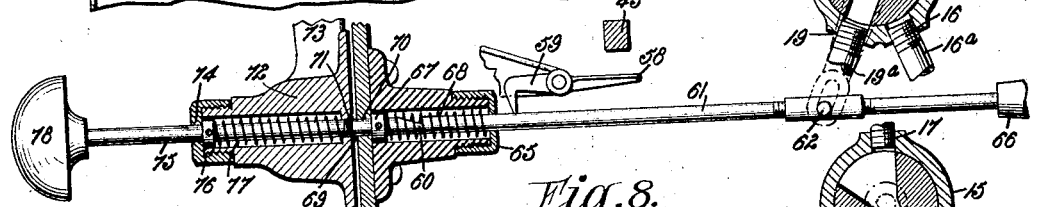
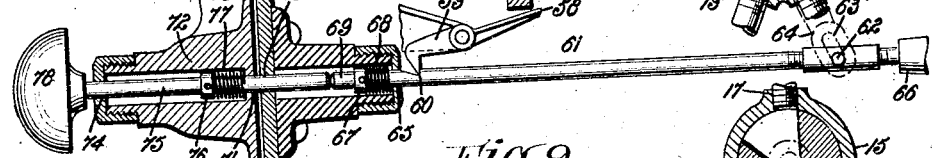
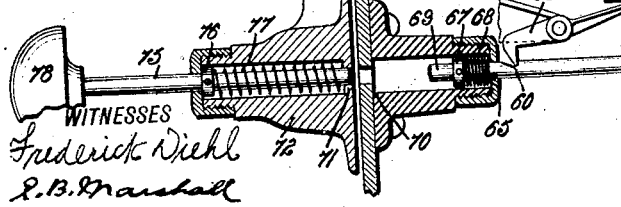

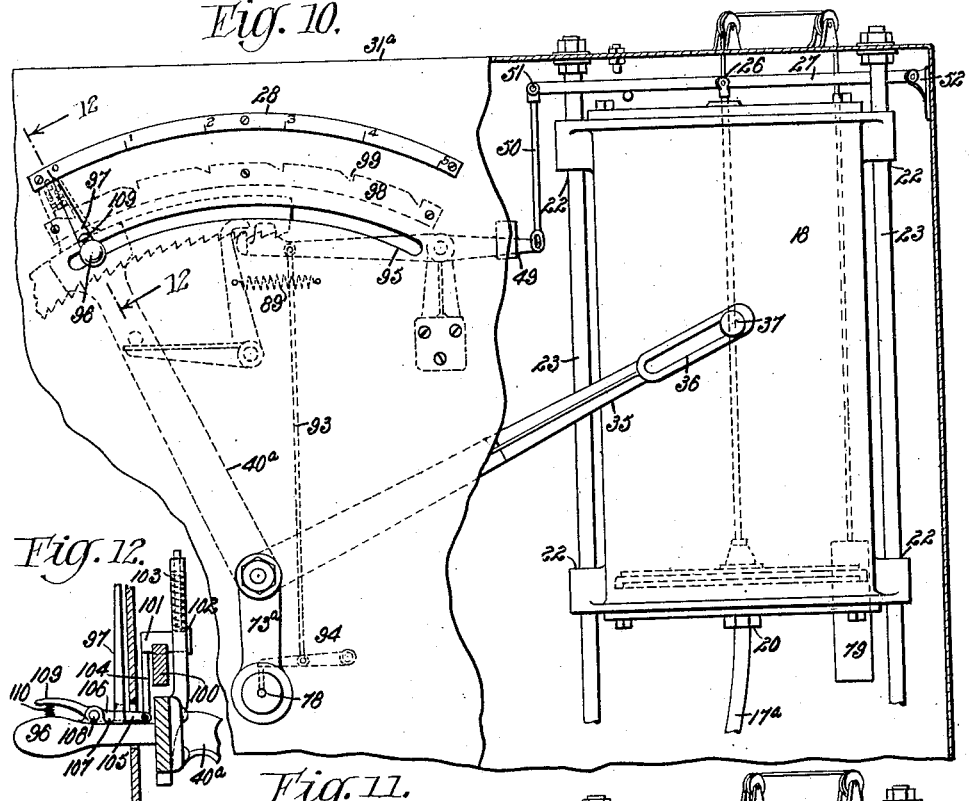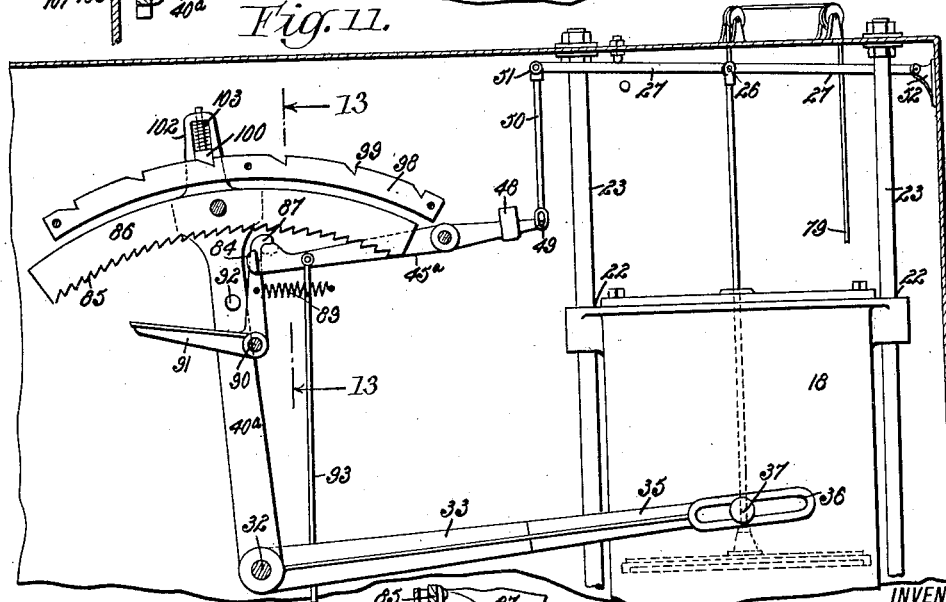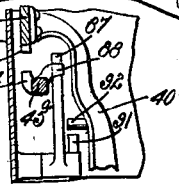

UNITED STATES PATENT OFFICE.

SIDNEY FITZHUGH MIOTON, OF NEW ORLEANS, LOUISIANA.

FLUID-MEASURING DEVICE.

1,236,967.

Specification of Letters Patent.    Patented Aug. 14, 1917.

Application filed April 15, 1916.   Serial No. 91,321.

*To all whom it may concern:*

Be it known that I, SIDNEY FITZHUGH MIOTON, a citizen of the United States, and a resident of New Orleans, in the parish of Orleans and State of Louisiana, have invented a new and Improved Fluid-Measuring Device, of which the following is a full, clear, and exact description.

My invention has for its object to provide a fluid measuring device which cannot be operated until valve means are actuated, the movement to actuate the said valve means releasing a lever, which serves to move a member of the measure to draw the fluid therein, the return movement of the lever being prevented, and it being impossible to again move the valve means until a determined quantity of the fluid is contained in the measuring device, when, by means provided, the valve is operated to direct the fluid from the measure and out of the device, and the lever is permitted to return to inoperative position.

Additional objects of the invention will appear in the following specification, in which the preferred form of my invention is described.

In the drawings, similar reference characters denote similar parts in all the views, in which—

Figure 1 is a side elevation of my invention, parts being broken away to illustrate the construction;

Fig. 2 is a sectional view on the line 2—2 of Fig. 1;

Fig. 3 is a view similar to that shown in Fig. 1, but illustrating the position of the elements when the lever is moved to operate the measure;

Fig. 4 is a view similar to that shown in Fig. 3, but illustrating the position of the elements when the measure has been filled with a fluid, and the lever and valve have been freed to return to primary position;

Fig. 5 is an enlarged sectional view on the line 5—5 of Fig. 1;

Fig. 6 is a fragmentary sectional view on an enlarged scale on the line 6—6 of Fig. 2;

Figs. 7, 8 and 9 are enlarged sectional fragmentary views illustrating the means for operating the valve and for freeing the lever;

Fig. 10 is a view showing a modified form of the invention with a portion of the casing broken away to illustrate features of construction;

Fig. 11 is a sectional view similar to that shown in Fig. 10, but illustrating the position of the elements when the measure has been filled with the fluid;

Fig. 12 is an enlarged fragmentary sectional view on the line 12—12 of Fig. 10;

Fig. 13 is a sectional view on the line 13—13 of Fig. 11; and

Fig. 14 is a fragmentary sectional view on the line 14—14 of Fig. 1.

By referring to the drawings, it will be seen that a three-way valve 15 is provided having a port 16 with which a container is connected by a pipe 16ª, a port 17 which is connected with a measuring cylinder 18 by means of a flexible pipe 17ª, and a port 19 which is connected to an outlet by a pipe 19ª. The flexible pipe 17ª is connected with a port 20 in the head 21 of the measuring cylinder 18, this measuring cylinder 18 having guideways 22 in which guide rods 23 are disposed. In the measuring cylinder 18 there is a piston 24 to which is secured a piston rod 25, the piston rod 25 being articulated at 26 to a lever 27. When the measuring cylinder 18 is moved downwardly relatively to the piston 24 a predetermined distance as indicated by a scale 28 in the manner which I will shortly describe, and the valve 15 is opened to afford communication between the pipe 16ª and the flexible pipe 17ª, the oil or other fluid contained in the container 120 will be drawn by suction through the pipe 16ª, the valve 15 and the flexible pipe 17ª, to the measuring cylinder 18 between the piston 24 and the head 21. The space between the piston 24 and the head 21 permits a quantity of oil or other fluid to be disposed between the piston 24 and the head 21 which will agree with the position of a pointer 29 relatively to an indicator 28. The oil or other fluid contained in the measuring cylinder 18 between the piston 24 and the head 21 passes out through the flexible pipe 17ª, the valve 15 and the pipe 19ª when the valve 15 is moved to the position indicated in Fig. 7 of the drawings.

The measuring cylinder 18 is lowered a predetermined distance relatively to the movement of the pointer 29 in the following manner. In bearings 30, secured to the casing 31, there is journaled a shaft 32, an arm 33 having a hub 34 which is keyed to the shaft 32, this arm 33 being bifurcated, with its terminals 35 provided with slots 36 in which pins 37 are disposed, the said pins 37 being secured to the sides of the measuring cylinder 18. It will, therefore, be seen that the measuring cylinder 18 may be lowered by a rotary movement of the shaft 32. There is also keyed to this shaft 32 a ratchet wheel 38, a cam wheel 39, and an arm 40 from the upper portion of which the pointer 29 projects, it being possible to move the arm 40 with its pointer 29 by a knob 41, so that the pointer 29 will be positioned as desired relatively to the indicator 28, which will move the measuring cylinder 18 down, in the manner set forth. The movement of the arm 40 is limited by stops 42, and when the device is not in use the arm 40 may be locked in primary position, by the locking means indicated at 43 in Fig. 1 of the drawings.

While the arm 40 may be moved to the right, as may be desired to move the measuring cylinder 18 downwardly, it is impossible to return the arm 40 to primary position until the space between the piston 24 and the head 21 has been filled with oil or other fluid, for a pawl 44 mounted on a lever 45 engages the ratchet wheel 38, the said ratchet wheel 38 and the arm 40 being both keyed to the shaft 32. This pawl 44 prevents the movement of the arm 40 to the left until the pawl 44 is moved out of engagement with the ratchet wheel 38 by the lever 45. This lever 45 is fulcrumed at 46, and an arm 47 of the lever has a weight 48 mounted thereon, so that under normal conditions the pawl 44 will at all times engage the ratchet wheel 38. The said arm 47 of the lever 45 has a pin-and-slot connection 49 with a link 50, the upper end of which is articulated at 51 to the lever 27, this lever 27 being fulcrumed to a bracket 52 secured to the casing 31. The pressure against the piston 24 when the space between the piston 24 and the head 21 is filled with oil or other fluid will, by means of the piston rod 25, the lever 27 and the link 50, raise the arm 47 of the lever 45 so that the pawl 44 will be freed from the ratchet wheel 38, thereby permitting the return of the arm 40 to primary position. If desired, a hand or other pump 53 may be connected with the pipe 16ª to make certain that the space between the piston 24 and the head 21 is filled with oil or other fluid, and that when the said space is filled with oil or other fluid, there will be sufficient pressure against the piston 24 to operate the piston rod 25 in the manner and for the purpose set forth. When the pawl 44 on the lever 45 is moved downwardly by the means set forth, the pawl 44 is prevented from again moving upwardly to engage the ratchet 38 until the arm 40 resumes its primary position, the means to prevent this upward movement of the pawl 44 being a pin 54 mounted on a spring 55 which is secured to a bracket 56 fastened to the casing 31, this pin 54 being adapted to engage a flange 57 extending from the lever 45 adjacent the pawl 44. When the lever 45 is operated to move the pawl 44 out of engagement with the ratchet wheel 38, the flange 57 will be moved below the pin 54 and the said pin 54 will engage the top of the flange 57 to hold the pawl 44 out of engagement with the ratchet wheel 38 until the cam 39, which is keyed to the shaft 32, is rotated with the shaft 32 and the arm 40 to engage the spring 55 and move the spring 55 to the position illustrated in Fig. 2 of the drawings, the cam 39 engaging and moving the spring 55 as set forth, when the arm 40 is returned to primary position, as illustrated in Fig. 1 of the drawings.

Not only are there means provided by which the lever 45 may free the pawl 44 from the ratchet 38 to permit the arm 40 to return to primary position, but the said lever 45 is adapted to operate means to move the valve 15 so that the flexible pipe 17ª will be connected with the outlet 19ª to permit the oil or other fluid contained in the measuring cylinder 18 to flow out of the measuring device. The said lever 45, when the pawl 44 moves downwardly, engages an arm 58 on a pivoted dog 59 to raise the dog 59 out of engagement with a recess 60 on a rod 61 this rod 61 having a pin 62 disposed in a slot 63 in a valve-operating arm 64. It will, therefore, be seen that as the rod 61 is journaled in bearings 65 and 66, and the rod 61 is provided with a collar 67 between which and the bearing 65 there is a spring 68, the said spring will move the rod 61 to the left when the dog 59 is raised, thereby operating the valve 15, in the manner set forth. Therefore, when the space between the piston 24 and the head 21 is filled with oil or other fluid, the pressure of the oil or other fluid against the piston 24 will operate the piston rod, and, by the means described, free the arm 40 for return movement, and operate the valve 15, so that the oil or other fluid which has passed from the container into the measuring cylinder will flow from the measuring cylinder out of the measuring device.

When the dog 59 is raised out of engagement with the rod 61, at the recess 60, the valve 15 is moved to connect the measuring cylinder 18 with the outlet 19ª, and this is the position of the valve when the measuring device is not in use, it being impossible by the means which I will now describe, to move the arm 40 to the right until the valve 15 has been moved to connect the pipe 16ª with the pipe 17ª. The movement of the arm 40 to the right is prevented prior to the said movement of the valve 15, by the end 69 of the rod 61 which, when the device is not in use, projects through an orifice 70 in the casing 31 and into a bearing 71 in a head 72 on an arm 73 which is secured to the arm 40, as illustrated in Fig. 5 of the drawings. The said head 72 not only has the bearing 71, but also a second bearing 74, a rod 75 being disposed in the said bearings 71 and 74 and being provided with a collar 76 and a spring 77 disposed between the said collar 76 and the bearing 71, for holding the rod 75 in the position illustrated in Fig. 7 of the drawings, so that the rod 75 will not prevent the end 69 of the rod 61 from entering the bearing 71. When the measuring device is to be operated, the rod 75 is pressed inwardly by its head 78 and against the resiliency of the spring 77, the rod 75 engaging the end 69 of the rod 61 to press the rod 61 to the right, thereby operating the valve 15, the dog 59 falling into the recess 60 in the rod 61 when the movement of the rod 61 to the right is completed. The dog 59 holds the rod 61 in the position illustrated in Fig. 8 of the drawings, and against the resiliency of the spring 68, while the spring 77 and the collar 76 serve to return the rod 75 to the position illustrated in Fig. 9 of the drawings, when the head 72 will be free to rotate with the arm 40, there being guide means which serve to direct the movement of the head 72 relatively to the face of the casing. Counterweights 79 are provided for raising the measuring cylinder 18 to make certain that the oil or other fluid contained in the measuring cylinder between the piston 24 and the head 21 will be quickly ejected when the valve 15 is operated to connect the flexible pipe 17ª with the outlet pipe 19ª, and the arm 40 is free to return to primary position. Stops 80 are provided to limit the movement of the lever 27. The pointer 29 is provided with a resiliently held tooth 81 for engaging recesses 82 in a plate 83, the positions of the said recesses 82 being opposite indicating marks 84 on the indicator 28, so that the arm 40 will be held yieldingly in position after adjustment.

The tooth 81 has a rounded end and the recesses 82 are also rounded, so that the arm 40 may be returned to primary position when sufficient pressure is applied after the tipping of the lever 45.

As has been stated, when it is desired to make use of the measuring device, the rod 75 is pressed inwardly from the position indicated in Fig. 7 to the position indicated in Fig. 8, thereby operating the valve 15 to connect the pipe 16ª with the flexible pipe 17ª, the rod 61 being held by the dog in the manner illustrated in Fig. 9 of the drawings, so that the arm 40 may be freely rotated to the right to the desired position, the movement of the arm 40 to the right lowering the measuring cylinder 18, as has been set forth, and oil or other fluid being drawn into the measuring cylinder between the piston 24 and the head 21 by suction or by the pump 53. The arm 40 is prevented from returning to primary position until the space in the measuring cylinder 18 between the piston 24 and the head 21 is filled with the oil or other fluid, and the pressure of the oil or other fluid against the piston 24 operates the piston rod, and by the means described, lowers the pawl 44, which frees the pawl 44 from the ratchet wheel 38, thereby permitting the return movement of the arm 40 to primary position, the pawl 44 being held out of engagement with the ratchet wheel 38 by the flange 57 and pin 54 until the return movement of the arm 40 is completed, the movement of the lever 45 to move the pawl 44 out of engagement with the ratchet wheel 38, serving to bring the lever 45 into engagement with the arm 58 of the dog 59 to operate the dog 59 to permit the outward movement of the rod 61, so that the end 69 of the rod 61 will be again disposed in the bearing 71 on the head 72 when the said head 72 is moved with the arm 40 back to normal position.

In the modified form of the invention illustrated in Figs. 10, 11, 12, and 13 of the drawings, a lever 45ª has a pawl 84 which normally engages ratchet teeth 85 on a segment 86 secured to an arm 40ª for moving therewith, the pawl 84 being held against upward movement and out of engagement with the ratchet teeth 85 when the lever 27 is moved upwardly, as illustrated in Fig. 11 of the drawings, by means of a hooked arm 87 which is disposed around a flange 88 on the lever 45ª and is held in this position by a spring 89, the hooked arm 87 being pivoted at 90 and being integral with an arm 91 which is engaged by a pin 92 on the arm 40ª when the said arm 40ª is returned to primary position, as illustrated in Fig. 10 of the drawings. It will be seen that by this means the pawl 84 is held out of engagement with the ratchet teeth 85 when the measuring cylinder 18 between the piston 24 and the head 21 is filled with oil or other fluid, and that the pawl 84 is not permitted to again engage the ratchet teeth 85 until the arm 40ª is returned to the position illustrated in Fig. 10 of the drawings. The lever 45ª is connected by a link 93 with a pivoted arm 94 which is disposed for operating the arm 58 of the dog 59. It will, therefore, be seen that when the pawl 84 is moved out of engagement with the ratchet teeth 85, the dog 58 will be freed from the recess 60 in the rod 61, to permit the return of the rod 61 to the position illustrated in Fig. 7 of the drawings, thereby moving the valve 15 to connect the measuring cylinder 18 with the outlet 19ª.

In this modified form of the construction, the arm 40ª is disposed within a casing 31ª and is secured to the shaft 32, an arm 73ª which carries the head 72 being disposed without the casing 31ª, but being secured to the shaft 32 and rotating therewith. There is a curved slot 95 in the casing 31ª, through which is disposed a handle 96 which extends from an arm 40ª, a pointer 97 extending upwardly from the said handle 96 to coöperate with the indicator 28, there being within the casing a plate 98 which is provided with notches 99 with which a tooth 100 is adapted to engage, the said tooth 100 being disposed in a guideway having a guide 101 disposed in a guideway 102 and being held yieldingly down by a spring 103. Connected with the guide 101 there is an arm 104, to which is articulated an arm 105 on a lever 106, the said lever 106 being disposed through an opening 107 in the pointer 97 and being articulated at 108 to the handle 96. The other arm 109 of the lever 106 is held yieldingly upwardly by means of a spring 110. With this construction, the arm 40ª may be moved to the left, but movement to the right is prevented by the pawl 84 and the ratchet teeth 85 until the pawl 84 is moved out of engagement with the said ratchet teeth, after the measuring cylinder 18 between the piston 24 and the head 21 is filled with the fluid. It will, therefore, be seen that when the arm 40ª is moved to the right by means of the handle 96, the pointer 97 and the indicator 28 will indicate to the user the position of the measuring cylinder 18 relatively to the piston 24, while the tooth 100 disposed within the casing 31ª, will engage the recess 99 in the plate 98 to check the operation. In other respects, the construtcion illustrated in Figs. 10, 11, 12 and 13, corresponds with the construction illustrated in Figs. 1 to 9.

The head 72 has a cam surface 72ª (Fig. 14) which serves to push the end 69 of the rod 61 inwardly when the arm 73 is returned to the position shown in Fig. 1.

Having thus described my invention, I claim as new and desire to secure by Letters Patent:

1. In a fluid measuring device, an adjustable measure, a valve connected therewith, means for locking the adjustable measure, and means to operate the valve which when actuated frees the first means.

2. In a fluid measuring device, a measure, a valve connected therewith, means for operating the measure, means for locking the first means, and means for operating the valve which when actuated frees the second means.

3. In a fluid measuring device, a measure, a lever having means for operating the measure which is operated by a movement of the lever in one direction, and means to prevent the return movement of the lever until the operation of the lever is completed.

4. In a fluid measuring device, a measuring member, a measuring body movable relatively to the measuring member, a lever having means to operate the measuring body on the movement of the lever in one direction, means to prevent the return movement of the lever until the filling of the measuring body is completed, a valve connected with the measuring body, means for locking the lever, and means to operate the valve and which when operated frees the third mentioned means.

5. In a fluid measuring device, a measuring member, a measuring body movable relatively to the measuring member, a lever having means to operate the measuring body on the movement of the lever in one direction, means to prevent the return movement of the lever until the filling of the measuring body is completed, a valve connected with the measuring body, means for locking the lever, means to move the valve to abnormal position which when operated frees the third mentioned means, and means to move the valve back to normal position when the movement of the measuring body is completed.

6. In a fluid measuring device, a measuring cylinder having a port, a piston in the cylinder, a piston rod secured to the piston, means supporting the piston rod, means for moving the cylinder relatively to the piston for the purpose specified, a three-way valve, and communicating means connecting the port in the measuring cylinder with the three-way valve.

7. In a fluid measuring device, a measuring cylinder having a port, guide means for the measuring cylinder, a piston in the cylinder, a piston rod secured to the piston, means supporting the piston rod, means for moving the cylinder relatively to the piston, a three-way valve, and communicating means connecting the port in the cylinder with the three-way valve.

8. In a fluid measuring device, a measuring cylinder having a port, a piston in the measuring cylinder, a piston rod secured to the piston, means supporting the piston rod, an indicator, and a lever having two arms, one for coöperating with the indicator and the other connected with the cylinder for moving the latter relatively to the piston.

9. In a fluid measuring device, a measuring cylinder having a port, a piston in the cylinder, a piston rod secured to the piston, means supporting the piston rod, an indicator, a lever for moving in one direction, one arm of the lever being connected with the cylinder for operating the latter and the other lever-arm being disposed for coöperating with the indicator, and means to prevent a return movement of the lever until the filling of the measuring cylinder is completed.

10. In a fluid measuring device, a cylinder having a port, a piston in the cylinder, a piston rod secured to the piston, a lever connected with the cylinder for moving the latter, ratchet teeth secured for moving with the lever, a pawl for engaging the ratchet teeth, and means connecting the piston rod with the pawl for disengaging the pawl from the ratchet teeth.

11. In a fluid measuring device, a cylinder having a port, a piston in the cylinder, a piston rod secured to the piston, a lever connected with the cylinder for moving the latter, ratchet teeth secured for moving with the lever, a pawl for engaging the ratchet teeth, means connecting the piston rod with the pawl for disengaging the pawl from the ratchet teeth, and an indicator with which the lever is adapted to coöperate.

12. In a fluid measuring device, a measuring cylinder having a port, a piston in the measuring cylinder, a piston rod secured to the piston, a lever connected with the measuring cylinder for moving the latter, ratchet teeth secured for moving with the lever, a lever having a pawl for engaging the ratchet teeth, a lever to which the piston is articulated, and a link connecting the two last mentioned levers.

13. In a fluid measuring device, a measuring cylinder having a port, a piston in the measuring cylinder, a piston rod secured to the piston, a lever connected with the cylinder for moving the latter, ratchet teeth secured for moving with the lever, a pawl for engaging the ratchet teeth, means connecting the piston rod with the pawl for moving the pawl out of engagement with the ratchet teeth, and means for holding the pawl out of said engagement until the return of the lever to primary position.

14. In a fluid measuring device, a cylinder having a port, a piston in the cylinder, a piston rod secured to the piston, a lever connected with the cylinder for moving the latter, ratchet teeth secured for moving with the lever, a pawl for engaging the ratchet teeth, means connecting the piston rod with the pawl for moving the pawl out of engagement with the ratchet teeth, a pin for engaging the pawl for holding the pawl out of said engagement, and means operable by the lever for moving the pin out of engagement with the pawl.

15. In a fluid measuring device, a valve, a rod connected with the valve for operating the latter, there being a recess in the rod, a dog for engaging the rod at the recess for holding the valve in a predetermined position, measuring means with which the valve is connected, and means to free the dog from the rod on the completion of the filling of the measuring means.

16. In a fluid measuring device, a measuring means, a container, an outlet, a three-way valve adapted to connect the measuring means with the container or the outlet, a rod connected with the valve for operating the latter, there being a recess in the rod, a dog for engaging the rod at the recess for holding the valve in a predetermined position, and means to free the dog from the rod on the completion of the filling of the measuring means.

17. In a fluid measuring device, a measuring means, a container, an outlet, a three-way valve adapted to connect the measuring means with the container or the outlet, a lever having two arms one adapted to operate the measuring means, the other arm having a guideway, a second guideway with which the said first guideway is adapted to register, a rod disposed in the second guideway and adapted to operate the valve, and a rod disposed in the first guideway and adapted to engage the first rod to operate the latter.

18. In a fluid measuring device, a measuring means, a container, an outlet, a three-way valve adapted to connect the measuring means with the container or the outlet, a lever having two arms one adapted to operate the measuring means, the other arm having a guideway, a second guideway with which the said first guideway is adapted to register, a rod disposed in the second guideway and adapted to operate the valve, and a rod disposed in the first guideway and adapted to engage the first rod to operate the latter, the first rod normally extending into the first guideway.

19. In a fluid measuring device, a measuring means, a container, an outlet, a three-way valve adapted to connect the measuring means with the container or the outlet, a lever having two arms one adapted to operate the measuring means, the other arm having a guideway, a second guideway with which the said first guideway is adapted to register, a rod disposed in the second guideway and provided with a recess, the rod being adapted to operate the valve, a rod disposed in the first guideway and adapted to engage the first rod to operate the latter, resilient means for holding the first rod extended in the first guideway, a dog for engaging the recess in the first rod, and means to operate the dog on the completion of the operation of the measuring means.

20. In a fluid measuring device, a measuring means, a container, an outlet, a three-way valve adapted to connect the measuring means with the container or the outlet, a lever having two arms one adapted to operate the measuring means, the other arm having a guideway, a second guideway with which the said first guideway is adapted to register, a rod disposed in the second guideway and provided with a recess, the rod being adapted to operate the valve, a rod disposed in the first guideway and adapted to engage the first rod to operate the latter, resilient means for holding the rod extended in the first guideway, a dog for engaging the recess in the first rod, and means to operate the dog on the completion of the operation of the measuring means.

21. In a fluid measuring device, a measuring cylinder having a port, a piston therein, a piston rod secured to the piston, a lever having an arm connected with the measuring cylinder for operating the latter, a container, an outlet, a three-way valve adapted to connect the port with the container or the outlet, another arm secured to move with the lever and having a guideway, a second guideway with which the said first guideway is adapted to register, a rod disposed in the second guideway and adapted to operate the valve, the rod being provided with a recess, a rod disposed in the first guideway and adapted to engage the first rod to operate the latter, resilient means for holding the first rod extended in the first guideway, a dog for engaging the recess in the first rod, and means connecting the piston rod with the dog for operating the latter.

22. In a fluid measuring device, a measuring cylinder having a port, a piston therein, a piston rod secured to the piston, a lever having an arm connected with the measuring cylinder for operating the latter, a container, an outlet, a three-way valve adapted to connect the port with the container or the outlet, another arm secured to move with the lever and having a guideway, a second guideway with which the said first guideway is adapted to register, a rod disposed in the second guideway and adapted to operate the valve, the rod being provided with a recess, a rod disposed in the first guideway and adapted to engage the first rod to operate the latter, resilient means for holding the first rod extended in the first guideway, a dog for engaging the recess in the first rod, means to prevent the return movement of the lever to primary position, and means connecting the piston rod with the said preventing means and with the dog for freeing the former and for operating the latter.

23. In a fluid measuring device, a measuring means, a three-way valve connected therewith, means to operate the measuring means, and means to operate the valve on the completion of the movement of the said operating means.

24. In a fluid measuring device, a measuring means, means to operate the measuring means, means to prevent the return movement of the second mentioned means and means to free the third means on the completion of the movement of the second means.

25. In a fluid measuring device, a measuring means, a valve connected therewith, means to operate the measuring means, means to prevent the return movement of the second means, and means to free the third means and to operate the valve on the completion of the movement of the second means.

26. In a fluid measuring device, a measuring means, a valve connected therewith, means for locking the measuring means, means to move the valve to one position which when actuated frees the second means, means to operate the measuring means, and means to move the valve to another position on the completion of the movement of the fourth means.

27. In a fluid measuring device, a measuring means, a valve connected therewith, means for locking the measuring means, means to move the valve to one position which when actuated frees the second means, means to operate the measuring means, means to prevent the return movement of the fourth means, and means to free the fifth means and to move the valve to another position on the completion of the movement of the fourth means.

28. In a fluid measuring device, a measuring means, a valve connected therewith, means for locking the measuring means, means to operate the valve which when actuated frees the second means, means to operate the measuring means, means to prevent a return movement of the fourth means, and means to free the fifth means on the completion of the movement of the fourth means.

29. In a fluid measuring device, a measure, a lever having means to operate the lever, a valve connected with the measure, means for locking the lever, and means to operate the valve which when operated frees the second mentioned means.

30. In a fluid measuring device, a measure, a lever having means to operate the measure, a valve connected with the measure, means for locking the lever, means to move the valve to abnormal position which when operated frees the second mentioned means, and means to move the valve back to normal position when the filling of the measure is completed.

SIDNEY FITZHUGH MIOTON.

Copies of this patent may be obtained for five cents each, by addressing the "Commissioner of Patents, Washington, D. C."